United States Patent
O'Donnell et al.

(10) Patent No.: US 7,117,529 B1
(45) Date of Patent: Oct. 3, 2006

(54) IDENTIFICATION AND AUTHENTICATION MANAGEMENT

(75) Inventors: William O'Donnell, Westford, MA (US); Daniel Wilks, Mountain View, CA (US)

(73) Assignee: Intuit, Inc., Mountain View, CA (US)

( * ) Notice: Subject to any disclaimer, the term of this patent is extended or adjusted under 35 U.S.C. 154(b) by 856 days.

(21) Appl. No.: 10/029,765

(22) Filed: Oct. 22, 2001

(51) Int. Cl.
*H04L 9/32* (2006.01)

(52) U.S. Cl. .............................................. 726/6; 705/1

(58) Field of Classification Search ............... 713/170; 715/741; 707/10; 726/10, 4, 6, 11, 12; 705/1, 705/35, 44
See application file for complete search history.

(56) References Cited

U.S. PATENT DOCUMENTS

| | | | |
|---|---|---|---|
| 6,161,098 A | | 12/2000 | Wallman |
| 6,965,881 B1 * | | 11/2005 | Brickell et al. ............... 705/76 |
| 2002/0002678 A1 * | | 1/2002 | Chow et al. ................. 713/169 |
| 2002/0013898 A1 * | | 1/2002 | Sudia ......................... 713/155 |
| 2002/0147917 A1 * | | 10/2002 | Brickell ...................... 713/193 |
| 2003/0149667 A1 * | | 8/2003 | Onishi et al. ................. 705/51 |

OTHER PUBLICATIONS

Control-F1,"Control-F1 Launches CF1Live 'Branded, Hosted, Rented' eSupport Solution", Jul. 6, 2000, pp. 1, obtained from http://web.archive.org/web/20001121025300/www.control-f1.com/news/pr_cf1livelaunch.html.*
Zhang et al., "A Rule-Based Framework for Role-Based Delegation", May 2001, pp. 153-162.*
"Unix Man Pages," v. 1.5.4, pp. 1-5, Jan. 12, 1998.
Quicken User's Guide, Version 5 for Windows, Intuit, Sep. 1995, pp. 1-283.

* cited by examiner

*Primary Examiner*—Emmanuel L. Moise
*Assistant Examiner*—Jeffrey Popham
(74) *Attorney, Agent, or Firm*—Fenwick & West LLP

(57) ABSTRACT

An identification and authentication scheme maintains control relationships among identities in order to allow a user to dynamically grant or deny permission for a technical support representative to access the user's data, while allowing the user to retain ultimate control over access to the data. Interactions entered by the representative can be distinguished from those entered by the user, while execution paths for representative-entered interactions are configured so that, to an application, the representative-entered transactions appear substantially identical to user-entered transactions. Technical support representatives are thereby able to duplicate users' problems to enable diagnosis and resolution of problems without requiring users to reveal their passwords or login credentials.

60 Claims, 5 Drawing Sheets

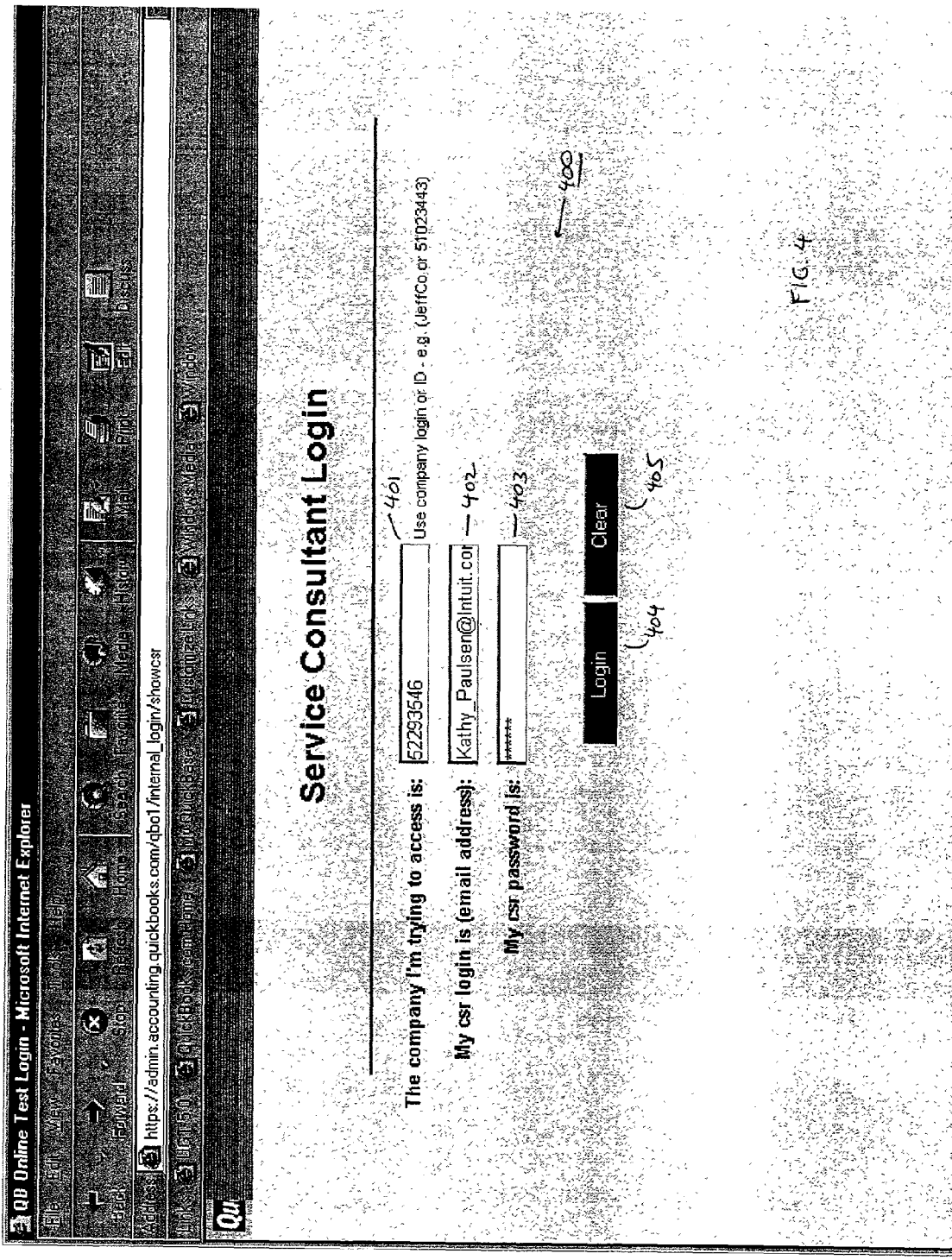

Service Consultant Status

Current Status: Service Consultant Enabled — 502
Company ID: 52293546 — 503

- Disable Service Consultant — 504
- View modifications made by Service Consultant — 505

501

Close — 506

QuickBooks for the Web

500

The QuickBooks for the Web team is committed to providing the best service possible. We've designed Help to answer your most common questions. When that's not enough, we have a team of Service Consultants ready to assist you. If our service isn't up to your expectations, please let us know. We want to learn from you how to be better.

Select the right link for you:

- Help Overview

The Help Overview is available 24 hours a day, 7 days a week. It has an index listing every piece of information we publish.

- Contact a Service Consultant

- Contact us about your QuickBooks for the Web subscription

Submit your question anytime. Support will contact you as soon as possible during our normal business hours. We are open Monday-Friday, 8:00 a.m. - 4:00 p.m., Pacific Time.

- Send a suggestion

Enable Support

Only use Enable Support when you are communicating with a QuickBooks for the Web Service Consultant. It allows the Service Consultant temporary access to your company data so they can help you.

Is it safe?

- You control access. You or another user of your company are the only people who can grant access to your company's data.
- Access is temporary. When a Service Consultant logs out of your company, they can't get back in.
- You can remove access anytime. You can disable access to your data at any point, even when the Service Consultant is logged in.

FIG. 5

IDENTIFICATION AND AUTHENTICATION MANAGEMENT

BACKGROUND OF THE INVENTION

1. Field of the Invention

The present invention is related to identification and authentication in computer systems, and more particularly to specifying, implementing, and maintaining control relationships among identities in an identification and authentication management scheme in order to enable temporary access to user data for technical support purposes.

2. Description of the Background Art

In computer technical and customer support, it is often useful to reproduce a problem that is being experienced by a user in order to troubleshoot or resolve the problem. Reproducing a user's problem can be particularly difficult when the support representative is at a different location than the user. For example, the user may call a remote technical support center for assistance in diagnosing and resolving a problem, and the technical support representative is unable to see the user's screen directly. In an attempt to diagnose the problem, the support representative may attempt to duplicate the user's problem on the support representative's own machine.

However, the support representative may require access to the user's own data in order to successfully replicate the problem. When the user's data is stored on a remote repository such as a server, the support representative may attempt to access the user's stored data and perform various tasks on the data in an attempt to replicate, identify, and resolve the problem. This approach is particularly common for online (e.g., web-based) applications, as commonly implemented by an Application Service Provider (ASP), where the user data is typically located on a central server to which the support representative has access. If the data is password-protected, the user may provide the representative with the customer's login identifier and password, so as to permit the representative to access the customer's data.

For some applications, such as financial applications or accounting applications, the user's data is sensitive and/or confidential. A user may be reluctant to provide his or her login and password information to a technical support representative; by providing such information, the user relinquishes control over the data and exposes the data to various security risks. Users may worry that the representative may be careless with the data, or that the password may fall into the wrong hands, or that the data may be misused. In short, once a user has provided his or her login and password information, security risks are introduced, and data integrity is at risk. The user can subsequently change his or her password, but many users do not make these changes, and even if they do, until the change is made, their data is at risk.

Furthermore, in the context of a network-based application, in order for a support representative to most effectively identify a problem with the application, it is desirable for the online application to function in the same manner whether a user or a technical support representative is interacting with it. In particular, when a representative is manipulating data and otherwise interacting with the online application, the application should function in the same manner as it does when the user performs the same operations. If the behavior of the application differs depending on whether a user or a support representative is interacting with it, the support representative may not be able to effectively diagnose the problem. On the other hand, it may be useful, particularly after the fact, to be able to distinguish between user-entered interactions and those entered by the support representative, so that the user can determine which interactions are bona fide and which were entered merely for diagnostic purposes. Conventionally, when the representative interacts with the application using the user's login identifier and password, it may not be possible to distinguish the representative's interactions from the user's interactions.

The Unix operating system provides a "sudo" command, which allows a user to act as a root user or other superuser, when authorized to do so by the actual root user. However, the sudo command has several limitations that render it unsuitable for granting access in a customer support environment as discussed herein. For example, user activity under the sudo command is not tracked separately; thus, it cannot easily be determined which actions were performed by an actual root user and which were performed via the sudo command. In addition, sudo is relatively inflexible, and does not allow relationships among entities such as users, support representatives, or groups, to be established and modified as needed. Also, a sudo session applies only to a single host or machine, and is not capable of controlling user access for a number of machines, services, or applications. In addition, sudo generally applies only in connection with a root user, and not with other arbitrary users. Finally, sudo does not provide sufficient granularity for use in technical support sessions; a user is unable to specify that a support representative be permitted to access particular data associated with the particular user, and to do so in a manner that makes it appear (to the application) as though the activity is under the direction of the particular user.

What is needed, therefore, is an identification and authentication management scheme that maintains control relationships among identities in order to allow a user to dynamically grant or deny permission for a technical support representative to access the user's data, while allowing the user to retain ultimate control over access to the data. What is further needed is a scheme that allows a user to retain such control even when his or her data is stored on a central server.

What is further needed is a scheme that allows interactions entered by the representative to be distinguished from those entered by the user.

SUMMARY OF THE INVENTION

The present invention provides an identification and authentication scheme that addresses the above limitations by providing identity objects capable of representing the identity of human users, groups, companies, automated processes, service providers, roles, or the like. The authentication system provides functionality for specifying, creating, and removing control relationships between identities or between identity objects. When an identity relationship specifies that one identity associated with entity A controls another identity associated with entity B, the identification scheme allows B to act in context as A. Thus, a software application that normally allows access to the identity associated with entity A can transparently allow access to the identity associated with entity B acting as entity A. From the point of view of the application, the fact that entity B is actually conducting the interaction with the application is irrelevant, although in one embodiment this fact is logged for future inspection by auditing systems.

In conjunction with the above-described scheme, a password management system allows each end user to be the only one to ever know his or her password. Each identity is associated with a password. Thus, a user can allow a support representative to have access to the user's data without giving the support representative the user's password. In addition, the user maintains ultimate control of his or her data, and can specify that the representative's access is temporary, and can further request, at any time, that the access be terminated.

The present invention provides a mechanism by which a user can allow a support representative to access the user's data without requiring the user to provide his or her personal password to the support representative. The user grants access to a representative, for example by specifying the type and duration of access to be granted. The representative can be individually identified, or identified as part of a group. For example, a generic "technical support" login can be enabled, so as to allow access to any technical support representative. The representative is granted access to the user's data, and is treated as the user for purposes of interacting with the application and data. In one embodiment, an audit log tracks the actual credentials used to access the application and data, so that the representative's actions can be identified and distinguished from those of the user. The representative's access privileges can be set to automatically expire after a specified time period, or after a certain number of accesses. The user may also retain the ability to terminate (or extend) the representative's access privileges at any time.

Identities can correspond to individual users or to groups of users. The present invention can be generalized to provide any desired level of access control among identities. Thus, a first user (or user group) may grant a second user (or user group) any desired level of the first user's behavior, rights, and/or privileges with respect to the first user's data.

The present invention provides a mechanism that allows interactions entered by a support representative to be distinguished from those entered by the user, even though the execution paths for representative-entered interactions are as similar as possible to those of user-entered interactions, so that to an application the representative-entered transactions appear substantially identical to user-entered transactions.

Accordingly, the present invention allows a technical support representative to duplicate the user's problem and interact with the user's data in such a manner that assists in diagnosing and resolving the problem, but does not require the user to reveal his or her password (or other login credentials) to the technical support representative.

BRIEF DESCRIPTION OF THE DRAWINGS

FIG. 4 is a screen shot depicting a support representative login screen according to one embodiment of the present invention.

FIG. 5 is a screen shot depicting a support status dialog box according to one embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention.

DETAILED DESCRIPTION OF THE PREFERRED EMBODIMENTS

Figure 1:
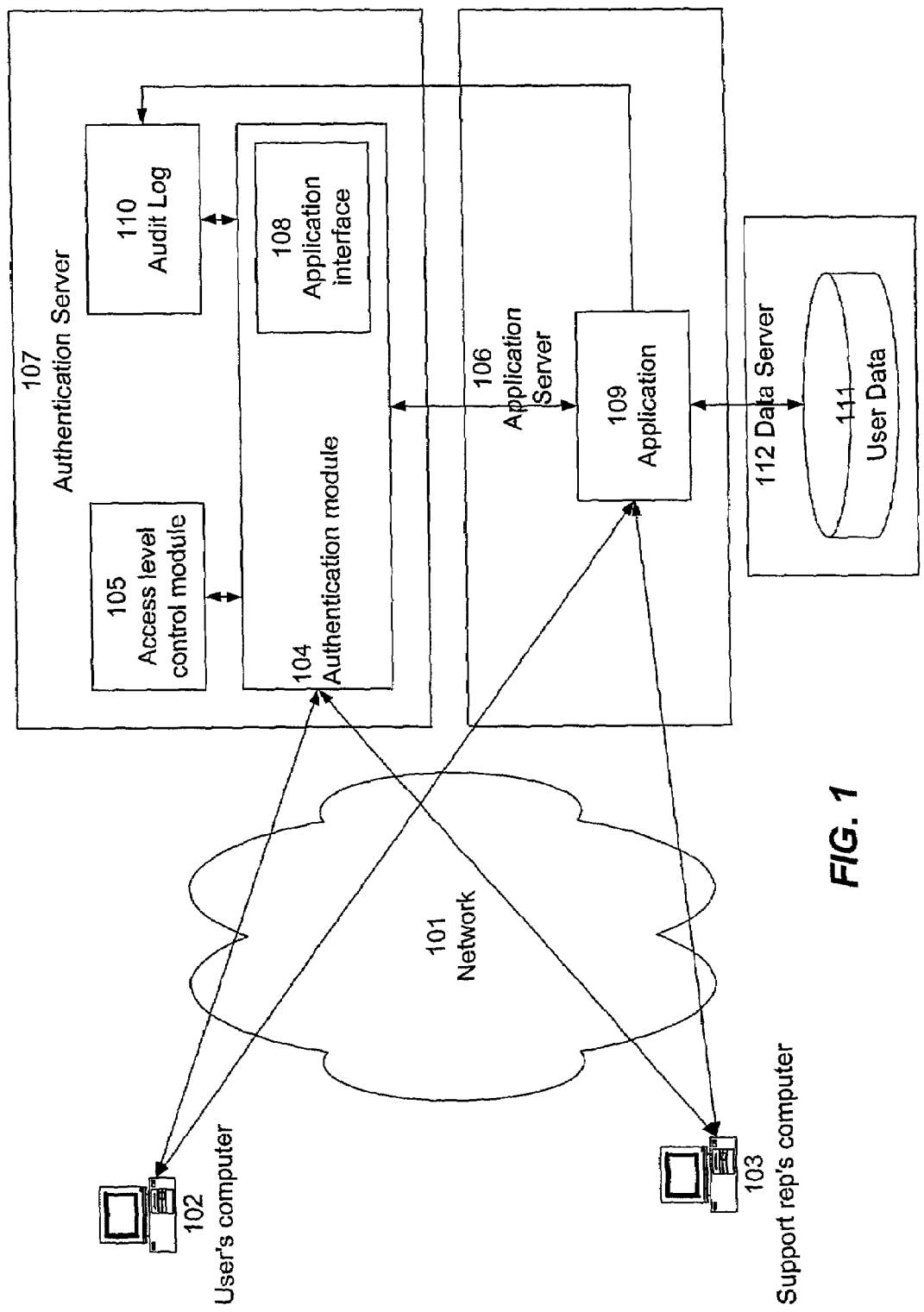
FIG. 1 is an example of a system for practicing the present invention according to one embodiment.

Referring now to FIG. 1, there is shown an example of a system for practicing the present invention according to one embodiment. In the example of FIG. 1, the invention is implemented in a network environment, as a mechanism for providing a support representative ("support rep") with limited access to a user's data for diagnostic purposes.

User's computer 102 is a conventional computer, such as a personal computer running an operating system and one or more software applications. The operating system may be, for example, Microsoft Windows™, available from Microsoft Corporation of Redmond, Wash., or it can be any other operating system as is known in the art. Software applications may include conventional client-based desktop applications, as well as network-based applications having a client component and a server component. Computer 102 is connected to network 101, such as the Internet, using well-known network connection schemes. For example, computer 102 may be connected via a dial-up modem, cable modem, digital subscriber line (DSL), T1, T3, or other network connection. Computer 102 may communicating via network 101 to other resources connected to network 101, using established protocols such as TCP/IP, HTTP, FTP, and the like.

In conventional client-based applications, user data is stored locally on user's computer 102. For example, a personal finance software package such as Quicken®, available from Intuit, Inc. of Mountain View, Calif., may store user data, including transactions, portfolios, and the like, on a hard drive (not shown) on user's computer 102, using techniques that are well known in the art.

By contrast, in network-based applications as may be provided by an application service provider (ASP), user's computer 102 communicates with network resources, such as application server 106, to perform the functionality associated with the software application. An example of a network-based application is QuickBooks® for the Web, available from Intuit Inc. of Mountain View, Calif. User data 111 may be stored on a network resource such as data server 112. Alternatively, some subset of user data may be stored on data server 112, while other user data may be stored locally at user's computer 102. In addition, in some implementations of network-based applications, redundant storage of user data is performed, so that the user interacts with a local version of the data, which is periodically sent to data server 112 to update a server-based version of user data 111.

In one embodiment, data server 112 is implemented according to data storage techniques that are well known in the art. User data 111 may be stored on a hard drive, according to any known technique for organizing data. For example, user data 111 may be stored in a database such as an Oracle database or the like. Application server 106 is implemented using techniques that are well known in the art. User's computer 102 runs a client component, which may be a conventional browser such as Microsoft Internet Explorer, or may be a client-based software application component, to communicate with application server 106. The user thus interacts with user data 111 via the functionality of application 109, as accessed over network 101 by client software running at computer 102.

In general, many users may have access to application server 106. In order to ensure that user data 111 is secure and only accessible to authorized individuals, authentication server 107 provides functionality for authenticating users for access to application server 106 and to data stored on data server 112. In particular, authentication server 107 verifies login credentials for users that are attempting access, and allows or denies access accordingly. Such credentials may include user logins, passwords, biometric data, IP address verification, and the like, or any combination thereof. In one embodiment, access level control module 105 defines access parameters for users; in response to a user request for access, authentication module 104 consults access level control module 105 to determine what level of access is appropriate for the user making the request.

The present invention provides a scheme for facilitating access to application 109 and to user data 111, in a secure manner, by a support representative so as to facilitate support functions such as diagnosis and troubleshooting. Support representative's computer 103 is a conventional computer, such as a personal computer running an operating system and one or more software applications. In one embodiment, computer 103 runs the same client components as does computer 102, for accessing application server 106 and running application 109 thereon. In another embodiment, computer 103 runs a superset of the client components, or an enhanced version of such components, so as to enable the support representative to perform diagnostic and troubleshooting functions with respect to application 109. By running client components that are identical to or related to those components being run at computer 102, computer 103 allows a support representative to duplicate the user's experience and application interaction and thereby more easily identify and diagnose problems.

Computer 103 interacts with authentication server 107 and application server 106 via network 101, in a manner similar to analogous interactions for computer 102. To the extent possible within the framework of a technical support environment, computer's 103 interactions with server components are designed to be substantially identical to those of user's computer 102, so that the support representative can better diagnose problems. However, in some embodiments, additional functionality is provided for use by support representative that may not be available on user's computer 102.

In one embodiment, computer 103 may be connected to authentication server 107 and application server 106 via a network other than network 101. In particular, computer 103 may be connected via a secure network to which computer 102 does not have access, such as an internal corporate network. Such an arrangement may enhance security, and may ensure that some functions (such as the ability to sign on as another user) are only accessible to computers 103 connected to the secure network.

As will be described in more detail below, the support representative is granted access to user data 111 in a limited fashion, so as to preserve the security and integrity of data 111. Access may be limited temporally, so that a support representative's access privileges with respect to particular user data 111 are temporary. Access may also be limited in a functional or operational sense, so that support representatives are not permitted to perform certain actions that may be permitted for actual users (such as deleting data, for example). Access level control module 105 defines access parameters for support representatives, and provides information to authentication module 104 to define how long support representative access is to be made available, what type of access is permissible by support representatives, and the like.

In one embodiment, authentication module 104 controls support representative access and communicates with application 109 in such a manner that, to application 109, it appears as though the actual user is performing the interaction, rather than a support representative. Communication with application 109 may be performed by an application interface 108 that is designed to communicate authentication information to application 109, or by other functionality in module 104. For example, an agency relationship layer (not shown) may be provided that acts as an intermediary between application 109 and computers 102 and 103, to make actions of the support representative appear as though they are being performed by the actual user. Agency relationship layer can function under the direction of authentication module 104 and access level control module 105. In this manner, the support representative is able to "step into the shoes" of the user and thereby duplicate the precise problem the user is having. Audit log 110 tracks interactions with application 109, and in one embodiment keeps track of which interactions were performed by the actual user and which were performed by the support representative.

One example of an data format for audit log 110 is shown below:

```
CREATE TABLE PZOWN.PZ_AUDIT (
AUDIT_ID            NUMBER (22, 0)    NOT NULL   // unique key for this item
,ACTION_CODE        NUMBER (2, 0)                // specifies the nature of the event
,EVENT_CODE         NUMBER (2, 0)     NOT NULL   // specifies the nature of the event
,SERVICE_ID         NUMBER (22, 0)               // classifies the event by specifying the application
,COMPANY_AUTH_ID    NUMBER (22, 0)    NOT NULL   // part of first user's ID
,USER_AUTH_ID       NUMBER (22, 0)    NOT NULL   // part of first user's ID
,AGENT_AUTH_ID      NUMBER (22, 0)               // second user's ID (e.g. support rep)
,REMOTE_IP          VARCHAR2 (16)                // IP address of client that performed the action
,LOCAL_IP           VARCHAR2 (16)     NOT NULL   // IP address of server that was connected to client
,CREATE_DATE        DATE              NOT NULL   // date created
,CREATE_USER_ID     NUMBER (22, 0)    NOT NULL   // user ID of user that created the record
,DETAIL             VARCHAR2 (1000)              // further details on action and event
,DETAIL_CLASS_CODE  NUMBER (2, 0)                // further details
```

In one embodiment, the invention generates and stores an entry in audit log 110, according to a format such as that shown above, for each auditable transaction or event. One skilled in the art will recognize that any format may be used for audit log 110.

In one embodiment, authentication server 107 operates to control access to more than one application 109 running on one or more application servers 106. Similarly, various applications 109 may run in connection with different data servers 112 and different sources of user data 111. Thus, the techniques of the present invention can be extended to apply to more than one application 109 and/or more than one user data 111 source simultaneously. For example, with a single command, a user may grant a support representative access to user data 111 in connection with any number of machines, services, applications 109, and data servers 112. By centrally coordinating and logging such support representative access, the invention can ensure that the access is authorized in accordance with the user's instructions and specifications, regardless of how many applications 109 and data servers 112 are involved. Access can also be controlled, terminated, and managed centrally so as to minimize unauthorized access to user data 111.

Figure 3:
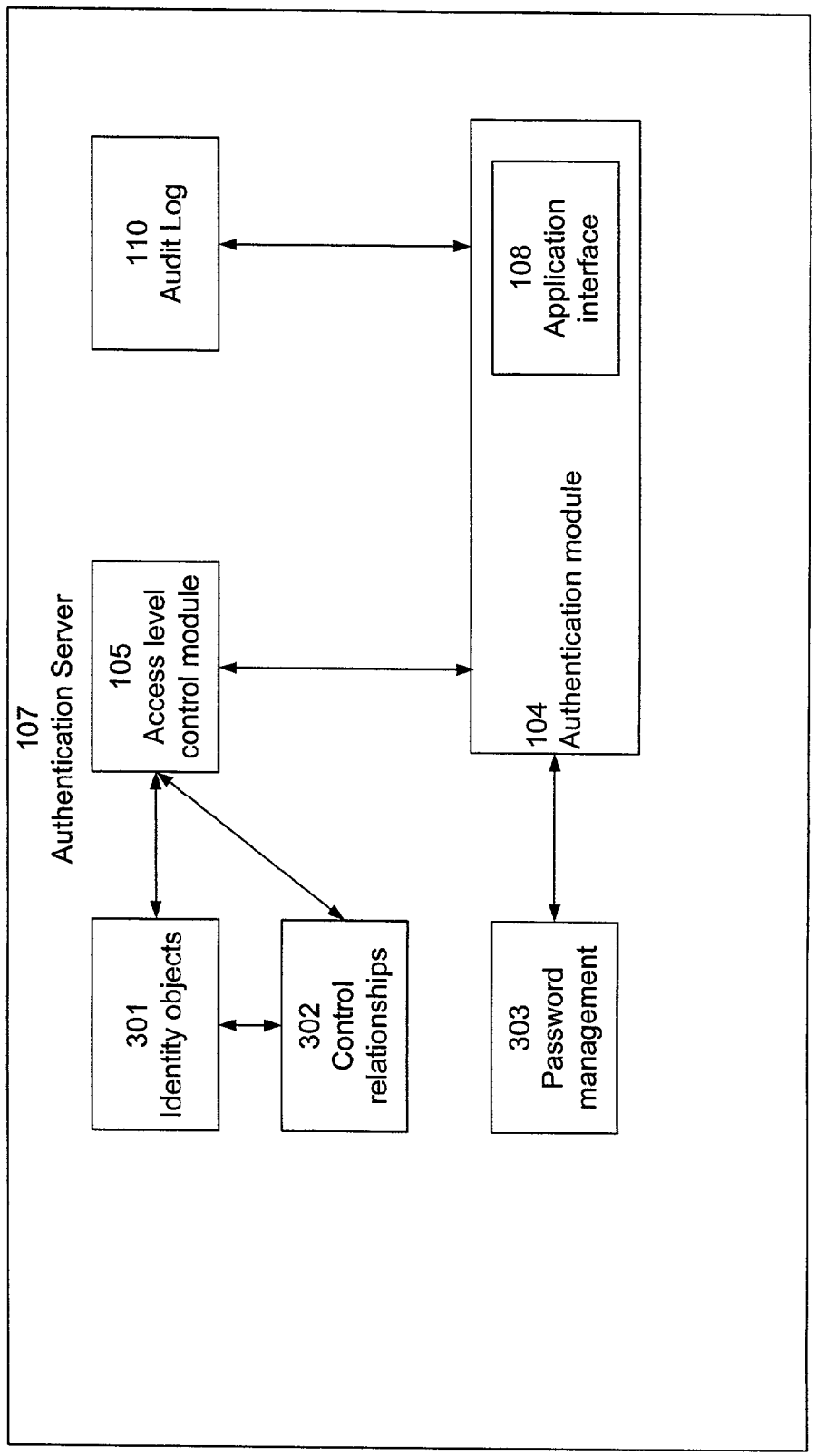
FIG. 3 is a block diagram depicting an authentication server according to one embodiment of the present invention.

Referring now also to FIG. 3, there is shown a block diagram depicting an authentication server 107 according to one embodiment of the present invention. Identity objects 301 represent entities such as users, support representatives, groups, companies, automated processes, service providers, roles, or the like. Each object 301 defines characteristics and parameters associated with a particular entity; such characteristics and parameters may include, for example, the resources the entity is permitted to access, the level of authentication to be performed in connection with the entity, the types of operations the entity is permitted to perform. In one embodiment, objects 301 are defined according to known techniques of object-oriented software programming; objects may therefore be related according to hierarchies and object classes, and may inherit properties and values from one another.

Control relationships 302 define any relevant relationships entities have with one another. For example, if one entity A controls another entity B, then B can act in context as A. Software that allows A access can transparently allow B acting as A. To the software, it would appear that A is performing the actions. Control relationships 302 are a mechanism for storing, updating, changing, and deleting relationships among entities.

In one embodiment, access level control module 105 provides functionality for maintaining identity objects 301 and control relationships 302, and for interpreting objects 301 and relationships 302 in the context of authenticating users. Thus, if a support representative attempts to access user data while acting as a user, module 105 consults control relationships 302 to determine whether the support representative is authorized to act as the user, and module 105 further consults identity objects 301 to determine whether, even while acting as the user, the support representative is authorized to take the action specified. In one embodiment, module 105 communicates with module 104, which provides instructions to application 109 as to whether to allow or deny the action. In one embodiment, application interface 108 performs the actual communication with application 109.

Password management module 303 is a conventional module for managing, storing, and updating user passwords in a secure manner. In one embodiment, passwords are stored in a secure database in password management module 303. Users can update and modify their passwords according to conventional user interface techniques and secure storage techniques.

The architecture depicted in FIG. 3 thus allows entities such as users, support representatives, and the like to authorize one another to access data, and provides a mechanism for maintaining such relationships while providing a secure password management system. The architecture thus provides an embodiment for an identification and authentication management system as described herein and as set forth in the claims.

Figure 2:
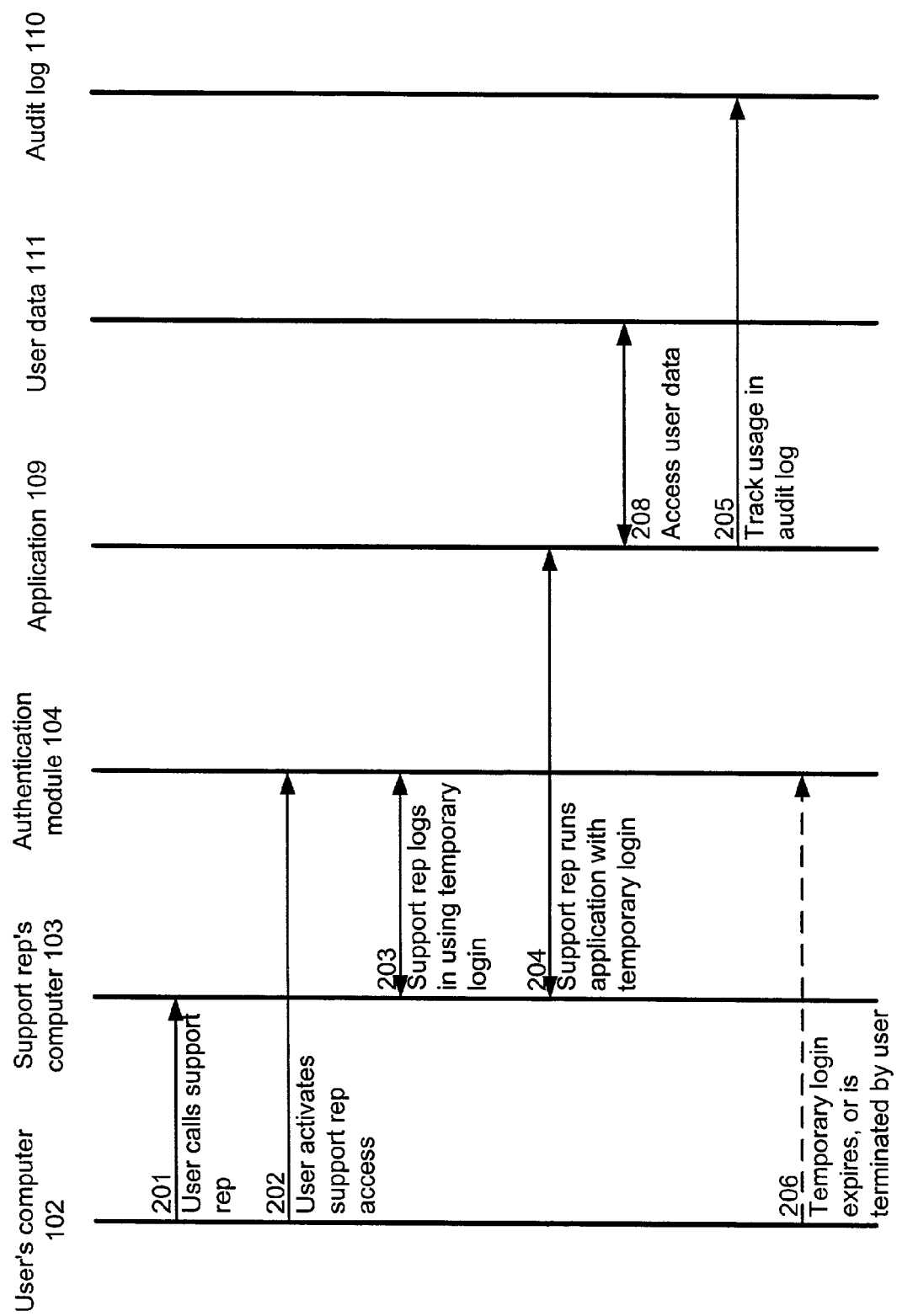
FIG. 2 is an event diagram depicting a method of the present invention according to one embodiment.

Referring now also to FIG. 2, there is shown an event diagram depicting a method of the present invention according to one embodiment. The method shown assumes that a user is running network-based software application 109 via his or her computer 102 over network 101, to access and interact with user data 111. The user has authenticated himself or herself via entry of a login identifier and password, or via some other authentication means. The user encounters some problem in attempting to perform a function on application 109, and contacts 201 a customer support center for help. A support representative answers the call and greets the user. One skilled in the art will recognize that the communication between the user and the support representative can take place via any communication medium, including telephone, e-mail, instant messaging, pager, and the like.

In the course of describing the problem to the support representative, the user may wish to show the support representative what is going on, in particular with the user's own data 111. In order to allow the support representative to duplicate the problem on the support representative's computer 103, the user activates 202 support representative access to user data 111. Depending on the nature of user data 111 and the authorization level of the user, the user may activate access to data relevant to the entire company, or just to the particular user, or to some subset of data. In one embodiment, the user specifies which data or subset of data the support representative is authorized to access.

In one embodiment, the user activates the representative's access via a command on the user's computer for granting access to a support representative. The command may be provided in the context of the client component of the application being run, or it may be provided in the context of an operating system function such as a Terminate and Stay Resident (TSR) program that may be activated in response to a predefined key combination or menu selection, or it may be provided in the context of a technical support application or plug-in. In one embodiment, a unique support representative ID is associated with the support representative; the support representative can then provide the support representative ID to the user, so that the user can enter the support representative ID via a dialog box or entry screen in order to grant that particular support representative access to user data 111. In another embodiment, the user does not specify a particular support representative or enter a support representative ID, but rather specifies that access should be granted to all authorized support representatives. In one embodiment, the user provides an expiry time or date, or a duration, or a maximum number of logins, after which the access granted to the support representative will expire; alternatively such parameters may be predefined. One skilled in the art will recognize that many other schemes may be used for the user to specify that access to user data 111 be granted to an individual support representative or to a set of authorized support representatives.

Once the user has activated support representative access, access level control module 105 is updated to indicate that support representative access has been activated, and to indicate the parameters and limitations of the support representative access. The support representative logs in 203 to application server 106. Authentication module 104 authenticates the support representative's login credentials to verify that the support representative has been granted access.

In one embodiment, support representative logs in 203 by providing his or her own login ID and password. Authentication module 104 recognizes the support representative's credentials, checks via module 105 that the support representative has been granted access to user data 111 for the particular user, and allows the support representative to access user data 111. In another embodiment, support representative logs in 203 using a special temporary login ID and password that is only effective for the current support session, or some other limited time period or number of accesses. In such an embodiment, the temporary login ID and password may be communicated to the support representative in step 202, when the user activates support representative access. For example, the temporary credentials may be e-mailed or instant-messaged to the support representative. Alternatively, the temporary credentials may appear on the user's screen when the user activates support representative access, and the user may then communicate the credentials to the support representative.

In an alternative embodiment, the support representative logs in 203 and specifies which user's data he or she is attempting to access. A dialog box may then appear on the user's screen, informing the user that the support representative is seeking access and prompting the user to authorize or deny the request. If the user authorizes the request, he or she is considered to have activated 202 the support representative access and created a temporary login for the representative. Thus, in this alternative embodiment, step 203 takes place before step 202. One skilled in the art will recognize that the steps of the described method may be rearranged in any order without departing from the essential characteristics of the present invention.

Once the support representative has logged in 203, he or she runs 204 application 109 and interacts with application 109 in a manner that is substantially identical to the manner in which an ordinary user interacts with application 109, including accessing and interacting with user data 111 via the interface of application 109. In accordance with the support representative's commands and interactions, application 109 accesses 208 user data 111 in the same manner as it would for the actual user. In particular, the support representative may attempt to perform certain actions and interactions that are similar to those that caused the user to experience problems. In this manner, the support representative seeks to replicate the user's problems and thereby diagnose and resolve them. In one embodiment, while the support representative runs 204 application 109, the support representative's commands and interactions are sent to application 109 as though they came from the actual user. Thus, to application 109, the support representative's actions are, in general, indistinguishable from user actions and appear to come from the actual user. In one embodiment, support representatives may be prohibited from performing certain actions (such as deleting data, or viewing particularly sensitive data); such proscriptions and limitations may be predetermined, or may be configurable by the user at the time support representative access is activated 202. If the support representative attempts a prohibited action, such action is intercepted by authentication module 104 before application 109 effects the action.

Support representative activity is tracked 205 and stored in audit log 110. In one embodiment, audit log 110 stores, for each action item, information specifying whether the action was performed by the actual user or the support representative. Thus, the user can later consult the audit log to see what actions the support representative performed. In one embodiment, functionality is provided for undoing those actions that were performed by the support representative, so that, once the support representative has completed the troubleshooting task, user data 111 can be restored to its previous state. In another embodiment, when the support representative begins interacting with user data 111, a backup copy of user data 111 is made; subsequently, user data 111 can be restored to its previous state using the backup copy.

At some point, the support representative's temporary login expires 206. Expiry can take place when any of the following events occur:

after a predetermined time period has elapsed (e.g. the temporary login may only last 24 hours, or some other time period that is preset or selectable by the user);

after a predetermined number of uses of the temporary login (e.g. the temporary login may expire after three uses, or some other number of uses, the number being preset or selectable by the user);

upon explicit command by the user to terminate the temporary login;

upon detection of a security breach or other significant event; or upon any combination of the above.

Expiry of the temporary login ensures that, once the troubleshooting task has been completed, user data 111 remains secure. In addition, the use of the temporary login as described above allows the support representative to access user data 111 for diagnostic purposes, without requiring the user to provide his or her personal login credentials and thereby compromise the security of user data 111. Finally, audit log 110 allows the user to see what transactions the support representative performed.

In an alternative embodiment, a designated support representative account is provided. The support representative account is intended for use only by support representatives, and can only be accessed via a back-end tech support login screen that is available only on support representative's computer 103. The back-end screen may be implemented for example, using application 109 with components of authentication server 107 as appropriate for back-end usage.

In another embodiment, the support representative account cannot be accessed from ordinary user's computers 102. In an alternative embodiment, the support representative account may be accessed from any computer, but special login credentials are provided only to support representatives, so that ordinary users cannot misuse the support representative account.

In such an embodiment, rather than using a temporary login, the support representative uses the designated support representative account, which belongs to the individual support representative or to a group of support representatives. In one embodiment, the designated account may also be associated with a particular user or a particular company. Referring again to FIG. 2, in this embodiment, the support rep logs in 203 using the designated support representative account and runs 204 the application using the designated support representative account. In one embodiment, application 109 tracks usage 205 in lieu of authentication server 106 tracking usage.

Referring now to FIG. 4, there is shown a screen shot depicting a support representative login screen 400 according to one embodiment. Screen 400 may be accessible only from support representatives' computers 103 and not from regular users' computers 102. This restricted access may be accomplished by requiring password authentication before screen 400 can be shown, or by only allowing access to screen 400 from computers having a designated Internet Protocol (IP) address range or physical location, or by keeping secret the Uniform Resource Locator (URL) for accessing screen 400, or by any other means for restricting access. Alternatively, screen 400 may be accessible from any computer, but may be configured to only authenticate login credentials for support representatives and not for regular users.

Company login field 401 accepts input to specify which user data is to be accessed. In one embodiment, field 401 accepts an internal identifier for the company associated with the user. In another embodiment, field 401 accepts a company login, user identifier, or any other identifier to specify the user or company. Support representative login field 402 accepts the support representative's personal login identifier. Support representative password field 403 accepts the support representative's personal password, for authentication purposes. Login button 404 initiates login credential authentication, and clear button 405 clears fields 401, 402, and 403. The support representative's login credentials may be authenticated by authentication server 107, or by a separate authentication server or module (not shown) specifically designated to authenticate support representatives.

Once the support representative has filled fields 401, 402, and 403 and clicked on login button 404 to initiate authentication, he or she is presented with feedback indicating whether access to user data 111 is granted. In one embodiment, the user is presented with a dialog box indicating that a support representative is attempting to access user's data 111 and providing options for authorizing or denying the request (and for specifying authorization parameters such as how long the authorization should last, number of logins permitted, and the like). The support representative may be provided with appropriate feed-back to indicate the request is pending, until the user indicates whether or not the request is authorized. Once the user responds, the support representative may be provided with additional feedback to indicate whether the request was authorized.

Alternatively, in another embodiment, the user first authorizes support representative access (and specifies authorization parameters), and then the support representative accesses screen 400 to enter login credentials and request access to the user's data. In this embodiment, if the user has authorized access, the support representative's request is granted immediately. If the user has not authorized access, the support representative's request is denied.

When a user wishes to grant a support representative access to user data 111, the user activates a command that allows support representatives to access the user's data 111. As described above, the user may activate this command by clicking on a button, selecting a menu item, or the like, either with or without prompting. If the support representative has requested access via login screen 400, the user may be presented with a dialog box or other screen display prompting the user to indicate whether access should be authorized or denied.

Rather than granting access to a particular support representative, such a command grants access to all support representatives as a group. Assuming that the support representative account credentials are maintained in a secure fashion, and/or are only functional when entered at a support representative's computer 103, such a scheme ensures that ordinary users cannot misuse the support representative account to gain access to other users' data.

Once the user has specified that support representative access be granted, the support representative can log in using the support representative account, and is thereby granted access to user data 111. While the support representative runs application 109, application 109 is presented with interactions as though they came from the actual user. Thus, to application 109, the support representative's actions are, in general, indistinguishable from user actions and appear to come from the actual user. In one embodiment, the support representative can only use the support representative account in connection with a particular user for a limited time, or for a limited number of logins, or according to some other limiting criterion. Unlike the above-described scheme wherein the temporary login expires, the support representative account does not expire altogether but becomes unusable with respect to a particular user (or company) when the terminating event takes place. For example, support representative accounts may be rendered unusable with respect to a particular user effective at a particular time each day.

As with the previous embodiment, support representative actions are tracked in the audit log 110 with a designation that such actions were performed by a support representative rather than by the actual user.

In one embodiment, a dialog box, icon, or other indicator is provided on the user's computer 102 to show whether the support representative's access is enabled or disabled, and to show when the support representative is logged on and interacting with the user's data 111. Referring now to FIG. 5, there is shown a screen shot depicting a support status dialog box 501 according to one embodiment of the present invention, overlapping a normal screen 500 as presented by application 109. Dialog box 501 informs the user as to the status of the support representative's interactions with the user's data, and provides options for terminating the support representative's access and/or viewing the actions performed by the support representative. In the example of FIG. 5, status indicator 502 shows that the support representative's access is enabled, and company ID indicator 503 shows the company ID under which the support representative obtained access. A Disable Service Consultant command 504 provides an option for immediately terminating the support representative's access. A View Modifications command 505 provides functionality for viewing the actions performed by the support representative, which may be retrieved from audit log 110. Close button 506 dismissed dialog box 501. One skilled in the art will recognize that dialog box 501 may contain other commands, status indicators, information, and options for monitoring and controlling support representative access.

The present invention thus provides a scheme whereby a support representative can access user data 111 in order to replicate and diagnose problems, without compromising the security of user data 111. Users retain ultimate control over their data. Furthermore, while the support representative is interacting with application 109, the interactions are made to appear as though the actual user is initiated them. Thus, application 109 acts substantially the same way as it would if the actual user were performing the actions being performed by the support representative. This allows the support representative to more easily diagnose problems, by avoiding the introduction of variation in operation that would otherwise take place without the techniques disclosed herein. In addition, the present invention allows users to grant support representatives access without requiring users to share their personal passwords.

The present invention provides capability for tracking which actions were performed by an actual user and which were performed by a support representative. In addition, the present invention is extremely flexible in allowing entity relationships to be established, modified, and terminated as needed. By operating across any number of application servers and data servers, the invention is capable of controlling access for any number of machines, services, or applications in a centralized manner and under the user's direction. Finally, the present invention allows a user to permit access to particular data associated with the user, or to a company, or any desired subset of data.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be the entire workflow system as detailed herein in the preferred embodiment or only portions of such a system. For example, the present invention can operate with an information system that need only be a browser in the simplest sense to present and display objects. Thus, the present invention is capable of operating with any information system from those with minimal functionality to those providing all the functionality disclosed herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A computer-implemented method for managing temporary access to a first user's data, comprising:

receiving, from a first user, a message at an authentication server, the first user having an authentication credential with respect to a first user's account used to interact with the first user's data through an application, the message that a second user be granted temporary access to the first user's data through the application;

receiving, from the second user, a request at the authentication server, the request to access the first user's data through the application; and responsive to the request from the second user, obtaining the first user's authentication credential from the authentication server and granting the second user temporary access to the first user's data through the application by providing to the application the first user's authentication credential, wherein the first user's authentication credential is not provided to the second user.

2. The method of claim 1, wherein granting the second user temporary access comprises activating a temporary access credential for the second user.

3. The method of claim 1, wherein granting the second user temporary access comprises creating an entity relationship between an account associated with the second user and an account associated with the first user.

4. The method of claim 3, wherein the account associated with the second user comprises a support representative account.

5. The method of claim 1, wherein the message identifies the second user and specifies a level of access for the second user, and wherein granting the second user temporary access comprises granting the specified level of access.

6. The method of claim 1, wherein the second user belongs to a group of users, and the message identifies the group of users to which the second user belongs.

7. The method of claim 6, further comprising:
receiving an identifier from the second user, identifying the second user as belonging to the group of users.

8. The method of claim 6, further comprising:
authenticating the second user as belonging to the group of users.

9. The method of claim 6, wherein the group comprises support representatives.

10. The method of claim 1, further comprising:
authenticating the second user;
and wherein granting the second user temporary access to the first user's data comprises:
responsive to the request from the second user and responsive to the authentication of the second user being successful, granting the second user temporary access to the first user's data by providing the first user's authentication credential.

11. The method of claim 1, wherein granting the second user temporary access to the first user's data comprises granting the second user a level of access different from a level of access available to the first user.

12. The method of claim 1, wherein receiving the message comprises receiving the message via a network.

13. The method of claim 12, wherein receiving the request comprises receiving the request via the network.

14. The method of claim 12, wherein receiving the request comprises receiving the request via a second network.

15. The method of claim 1, further comprising storing in an audit log information describing the second user's access to the first user's data and identifying the second user in connection with the access.

16. A computer-implemented method for managing levels of access to a first user's data for at least two users, comprising:
establishing a control relationship between a first user's authentication credential and a second user's authentication credential, the control relationship allowing the first user to specify at least one parameter of the second user's level of access to a first user's data;
receiving, from a first user, a message at an authentication server, the first user having an authentication credential with respect to a first user's account used to interact with the first user's data through an application, the message that a second user be granted temporary access to the first user's data through the application;
receiving, from the second user, a request at the authentication server, the request to access the first user's data through the application; and
responsive to the request from the second user, granting the second user access to the first user's data through the application according to the second user's level of access as specified by the first user, by providing to the application the first user's authentication credential, wherein the first user's authentication credential is obtained from the authentication server and is not provided to the second user.

17. The method of claim 16, wherein the second user is a support representative.

18. The method of claim 16, further comprising:
terminating the second user's access to the first user's data.

19. The method of claim 1 or 16, further comprising:
terminating the second user's access to the first user's data after a predetermined time period.

20. The method of claim 19, wherein the predetermined time period is selectable by the first user.

21. The method of claim 1 or 16, further comprising:
terminating the second user's access to the first user's data after the second user has accessed the first user's data a predetermined number of times.

22. The method of claim 21, wherein the predetermined number of times is selectable by the first user.

23. The method of claim 1 or 16, further comprising:
terminating the second user's access to the first user's data in response to a command received from the first user.

24. The method of claim 1 or 16, further comprising:
terminating the second user's access to the first user's data in response to a predetermined event.

25. The method of claim 1 or 16, further comprising:
responsive to granting the second user access, outputting, to the first user, notification of the second user's access to the first user's data.

26. The method of claim 1 or 16, further comprising:
responsive to granting the second user access, storing information describing the second user's access to the first user's data.

27. The method of claim 26, wherein storing information comprises storing the information in an audit log.

28. The method of claim 1 or 16, further comprising:
storing information describing at least one subsequent interaction with the first user's data.

29. The method of claim 28, wherein storing information comprises, for each interaction, storing information identifying which user accesses the first user's data.

30. The method of claim 1 or 16, wherein the access to the first user's data by the second user is masked so that an application through which the second user accesses the first user's data is unable to distinguish the access by the second user from access by the first user.

31. The method of claim 16, wherein the first user's level of access is different from the second user's level of access.

32. The method of claim 1 or 16, wherein the first user's data comprises at least one selected from the group consisting of:
a data file;
a data file stored at a server; and
data associated with the first user.

33. The method of claim 1 or 16, wherein the steps of the method are performed by a web-based application.

34. A system for granting to a second user access to a first user's data in response to a message from a first user, comprising:
an authenticator communicatively adapted to receive over a network connection authentication credentials of the first and second users and adapted to authenticate each user from the authentication credentials;
an access level control module, communicatively coupled to the authenticator, for defining for each user a level of access to a first user's data; and
a resource interface, communicatively coupled to the access level control module, for granting the second user access to the first user's data through the resource interface by providing the first user's authentication credential to the authenticator for authentication, wherein the first user's authentication credential is obtained from an authentication server and is not provided to the second user.

35. The system of claim 34, wherein the access level control module activates a temporary access credential for the second user.

36. The system of claim 34, wherein the access level control module creates an entity relationship between an account associated with the second user and an account associated with the first user.

37. A system for granting to a second user access to a first user's data in response to a message from a first user, comprising:
  an access level control module, for establishing a control relationship between an authentication credential associated with the first user and an authentication credential associated with the second user, the control relationship allowing the first user to control at least one parameter of the second user's level of access; and
  a resource interface, coupled to the access level control module, for granting the second user access to the first user's data through the resource interface according to the second user's level of access, by providing the first user's authentication credential to an authenticator, wherein the first user's authentication credential is obtained from an authentication server and is not provided to the second user.

38. The system of claim 34 or 37, wherein the resource interface further terminates the second user's access to the first user's data.

39. The system of claim 34 or 37, wherein the resource interface further terminates the second user's access to the first user's data after a predetermined time period.

40. The system of claim 39, wherein the predetermined time period is selectable by the first user.

41. The system of claim 34 or 37, wherein the resource interface further terminates the second user's access to the first user's data after the second user has accessed the first user's data a predetermined number of times.

42. The system of claim 41, wherein the predetermined number of times is selectable by the first user.

43. The system of claim 34 or 37, wherein the resource interface further terminates the second user's access to the first user's data in response to a command received from the first user.

44. The system of claim 34 or 37, wherein the resource interface further terminates the second user's access to the first user's data in response to a predetermined event.

45. The system of claim 34 or 37, further comprising:
  an output device, coupled to the resource interface, for outputting, to the first user, notification of the second user's access to the first user's data.

46. The system of claim 34 or 37, further comprising:
  a storage device, coupled to the resource interface, for storing information describing the second user's access to the first user's data.

47. The system of claim 46, wherein the storage device stores information identifying which user accesses the first user's data.

48. The system of claim 34 or 37, wherein the access to the first user's data by the second user is masked so that an application through which the second user accesses the first user's data is unable to distinguish the access by the second user from access by the first user.

49. The system of claim 34 or 37, wherein the first user's data comprises at least one selected from the group consisting of:
  a data file;
  a data file stored at a server; and
  data associated with the first user.

50. In a client/server system for granting to a second user access to a first user's data in response to a message from a first user specifying that the second user be granted access to the first user's data, a server comprising:
  an authenticator, for authenticating each user according to authentication credentials;
  an access level control module, coupled to the authenticator, for defining a level of access to the first user's data for each user; and
  a resource interface, coupled to the access level control module, for granting to a client operated by the second user access to the first user's data through the resource interface by providing the first user's authentication credential to the authenticator, wherein the first user's authentication credential is obtained from an authentication server and is not provided to the second user.

51. In a client/server system for granting to a second user access to a first user's data in response to a message from a first user specifying that the second user be granted access to the first user's data, a server comprising:
  an access level control module, for establishing a control relationship between the first user's authentication credential and the second user's authentication credential, the control relationship allowing the first user to control at least one parameter of the second user's level of access; and
  a resource interface, coupled to the access level control module, for granting to the client operated by the second user access to the first user's data through the resource interface according to the second user's level of access, by providing the first user's authentication credential to an authenticator, wherein the first user's authentication credential is obtained from an authentication server and is not provided to the second user.

52. A computer program product comprising a computer-usable medium having computer-readable code embodied therein for managing temporary access to a first user's data, comprising:
  computer-readable program code configured to cause a computer to receive a message at an authentication server from a first user, the first user having an authentication credential with respect to the first user's data, the message that a second user be granted temporary access to the first user's data;
  computer-readable program code configured to cause a computer to receive a request at the authentication server from the second user, the request to access the first user's data; and
  computer-readable program code configured to cause a computer to, responsive to the request from the second user, obtain the first user's authentication credential and grant the second user temporary access to the first user's data by providing the first user's authentication credential to an authenticator, wherein the first user's authentication credential is obtained from the authentication server and is not provided to the second user.

53. The computer program product of claim 52, wherein the computer-readable program code configured to cause a computer to grant the second user access comprises computer-readable program code configured to cause a computer to activate a temporary access credential for the second user.

54. The computer program product of claim 52, wherein the computer-readable program code configured to cause a computer to grant the second user access comprises computer-readable program code configured to cause a computer to create an entity relationship between an account associated with the second user and an account associated with the first user.

55. The computer program product of claim 52, further comprising:
computer-readable program code configured to cause a computer to authenticate the second user;
and wherein the computer-readable program code configured to cause a computer to grant the second user access to the first user's data comprises:
computer-readable program code configured to cause a computer to, responsive to the request from the second user and responsive to the authentication of the second user being successful, grant the second user access to the first user's data by providing the first user's authentication credential.

56. A computer-implemented computer program product for managing levels of access to a first user's data for at least two users, comprising:
computer-readable program code configured to cause a computer to establish a control relationship between a first user's authentication credential and a second user's authentication credential, the control relationship allowing the first user to specify at least one parameter of the second user's level of access to a first user's data;
computer-readable program code configured to cause a computer to receive, from a first user, a message at an authentication server, the first user having an authentication credential with respect to a first user's account used to interact with the first user's data through an application, the message that a second user be granted temporary access to the first user's data through the application;
computer-readable program code configured to cause a computer to receive, from the second user, a request at the authentication server the request to access the first user's data through the application; and
computer-readable program code configured to cause a computer to, responsive to the request from the second user, grant the second user access to the first user's data through the application according to the second user's level of access as specified by the first user, by providing to the application the first user's authentication credential, wherein the first user's authentication credential is obtained from the authentication server and is not provided to the second user.

57. The computer program product of claim 52 or 56, further comprising:
computer-readable program code configured to cause a computer to, responsive to granting the second user access, store information describing the second user's access to the first user's data.

58. The computer program product of claim 52 or 56, further comprising:
computer-readable program code configured to cause a computer to store information describing at least one subsequent interaction with the first user's data.

59. The computer program product of claim 58, wherein the computer-readable program code configured to cause a computer to store information comprises, computer-readable program code configured to cause a computer to, for each interaction, store information identifying which user accesses the first user's data.

60. The computer program product of claim 52 or 56, wherein the access to the first user's data by the second user is masked so that an application through which the second user accesses the first user's data is unable to distinguish the access by the second user from access by the first user.

* * * * *